(12) United States Patent
Takeuchi et al.

(10) Patent No.: US 7,158,468 B2
(45) Date of Patent: Jan. 2, 2007

(54) OPTICAL SYSTEM FOR OPTICAL HEAD (75) Inventors: Shuichi Takeuchi, Saitama-ken (JP);
Koichi Maruyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 701 days.

(21) Appl. No.: 09/962,301

(22) Filed: Sep. 26, 2001

(65) Prior Publication Data
US 2002/0060972 A1 May 23, 2002

(30) Foreign Application Priority Data
Sep. 27, 2000 (JP) .............................. 2000-294918

(51) Int. Cl.
*G11B 7/135* (2006.01)
(52) U.S. Cl. .................... 369/112.04; 369/112.23; 369/94; 369/44.23
(58) Field of Classification Search ............ 369/44.23, 369/44.14, 44.37, 94, 112.01, 112.03, 112.06, 369/112.07, 112.23, 112.08, 112.17, 112.26, 369/112.21, 112.05, 112.04
See application file for complete search history.

(56) References Cited

U.S. PATENT DOCUMENTS

| | | | | |
|---|---|---|---|---|
| 5,446,565 A | * | 8/1995 | Komma et al. ........... 369/44.23 |
| 5,526,336 A | * | 6/1996 | Park et al. ..................... 369/94 |
| 5,708,641 A | * | 1/1998 | Choi et al. ............. 369/112.07 |
| 5,933,401 A | * | 8/1999 | Lee et al. ............... 369/112.21 |
| 6,043,912 A | * | 3/2000 | Yoo et al. ................. 369/44.12 |
| 6,088,322 A | | 7/2000 | Broome et al. ........ 369/112.26 |
| 6,115,349 A | * | 9/2000 | Tawa et al. ............... 369/44.23 |
| 6,118,594 A | | 9/2000 | Maruyama ................... 359/719 |
| 6,134,055 A | * | 10/2000 | Koike ...................... 369/44.23 |
| 6,366,542 B1 | * | 4/2002 | Kojima et al. ........... 369/44.23 |
| 6,552,990 B1 | * | 4/2003 | Kajiyama et al. ...... 369/112.06 |
| 6,574,182 B1 | * | 6/2003 | Yamada et al. ........ 369/112.03 |
| 6,791,932 B1 | * | 9/2004 | Maruyama ............. 369/112.05 |

FOREIGN PATENT DOCUMENTS

JP 9197108 7/1997

OTHER PUBLICATIONS

An English Language abstract of JP 9-197108.

* cited by examiner

*Primary Examiner*—Hoa T. Nguyen
*Assistant Examiner*—Kim-Kwok Chu
(74) *Attorney, Agent, or Firm*—Greenblum & Bernstein, P.L.C.

(57) ABSTRACT

An optical system for an optical head of an optical disc drive is capable of using first and second discs, protective layer of the second disc being thicker than that of the first disc, a data density of the second disc being lower than that of the first disc. A light source selectively emits first and second laser beams having first and second wavelengths, respectively. An objective lens converges the first and second beams on the first and second discs, respectively. The second beam is incident on the objective lens as diverging light, and the first beam is incident on the objective lens as a beam of which degree of divergence is smaller. A diffraction lens structure is formed in the high NA exclusive area, which compensates for aberrations of a portion of the first laser beam, and causes aberrations to a portion of the second laser beam passed therethrough.

12 Claims, 11 Drawing Sheets

SPHERICAL ABERRATION SA
SINE CONDITION SC

FIG. 4B

SPHERICAL ABERRATION
CHROMATIC ABERRATION

SPHERICAL ABERRATION SA
SINE CONDITION SC

SPHERICAL ABERRATION
CHROMATIC ABERRATION

SPHERICAL ABERRATION SA
SINE CONDITION SC

SPHERICAL ABERRATION
CHROMATIC ABERRATION

SPHERICAL ABERRATION SA
SINE CONDITION SC

FIG.11B

SPHERICAL ABERRATION
CHROMATIC ABERRATION

SPHERICAL ABERRATION SA
SINE CONDITION SC

SPHERICAL ABERRATION
CHROMATIC ABERRATION

SPHERICAL ABERRATION SA
SINE CONDITION SC

FIG.15B

SPHERICAL ABERRATION
CHROMATIC ABERRATION

SPHERICAL ABERRATION SA
SINE CONDITION SC

SPHERICAL ABERRATION
CHROMATIC ABERRATION

SPHERICAL ABERRATION SA
SINE CONDITION SC

FIG.19B

SPHERICAL ABERRATION
CHROMATIC ABERRATION

FIG.20A — NA 0.60 — SPHERICAL ABERRATION SA / SINE CONDITION SC — SA, SC

FIG.20B — NA 0.60 — SPHERICAL ABERRATION CHROMATIC ABERRATION — 780nm, 775nm, 785nm

FIG.21A   FIG.21B

OPTICAL SYSTEM FOR OPTICAL HEAD

BACKGROUND OF THE INVENTION

The present invention relates to an optical system for an optical head, which can be used for two kinds of optical discs having different characteristics, and an objective lens for such an optical system.

There are a plurality of kinds of optical discs having different characteristics such as a thickness of a protective layer, data density and the like. For example, a CD (compact disc) or a CD-R (CD recordable) has a protective layer whose thickness is 1.20 mm. The data density of the CD or CD-R is relatively low. A DVD (digital versatile disc) has a protective layer whose thickness is 0.6 mm. The data density of the DVD is relatively high.

An optical system for an optical head used for data recording and/or readout generally includes a laser diode, an objective lens for converging the laser beam emitted by the laser diode on the optical discs, and a sensor for receiving light beam reflected by the optical discs and generating signals. In view of downsizing of the optical head, it is preferable that a single objective lens is used for various types of optical discs. Further, in order to make the optical head relatively thin, the focal length of the objective lens is preferably short.

However, when the laser beam incident on the objective lens is a parallel light, if the focal length is short, it is difficult to provide a sufficient working distance which is required to record/readout data on the optical disc having a thick protective layer, such as the CD or CD-R.

A numerical aperture (NA) is determined depending on the data density of the optical disc. For the disc having high data density, such as the DVD, it is necessary to form a relatively small beam spot. In order to form such a beam spot for a DVD, NA equals approximately 0.60. For the disc having low data density, such as the CD or CD-R, the beam spot must be larger, and the NA should be approximately 0.45. It should be noted that, if the spot size is too small in comparison with the width of a track of an optical disc, and in particular, if the employed data readout method utilizes diffraction of the light, as in data readout of the CD, sufficient diffraction effect is not provided, and therefore, the recorded data might not be readout correctly. Accordingly, when the CD or CD-R is used, the diameter of the light beam incident on the objective lens is typically confined to reduce the numerical aperture to form an appropriate beam spot (not too small) on the CD or CD-R.

In a conventional optical head, in order to vary the NA depending on the disc used, a variable aperture stop for mechanically varying the aperture size is provided at a beam incident side of the objective lens. However, such a structure requires a relatively large space, and prevents the downsizing of the optical system.

SUMMARY OF THE INVENTION

It is therefore an object of the invention to provide an improved optical system for an optical head, with which the focal length of the objective lens can be made short while still allowing a sufficient operable distance even for an optical disc having a relatively thick protective layer, and further, a sufficient NA can be set without providing an aperture stop on the beam incident side of the objective lens.

For the above object, according to the invention, there is provided an optical system for an optical head of an optical disc drive. The optical disc drive is capable of using different kinds of discs, e.g., a first disc and a second disc, a protective layer of the second disc being thicker than that of the first disc, and a data density of the second disc being lower than that of the first disc. The optical system is provided with a light source that selectively emits a first laser beam having a first wavelength and a second laser beam having a second wavelength, the first laser beam is used for the first disc, and the second laser beam is used for the second disc, the second wavelength being longer than the first wavelength. The optical system is further provided with an objective lens that converges the first beam and the second beam on the first disc and the second disc, respectively. The second beam is incident on the objective lens as a diverging light beam, and the first beam is incident on the objective lens as a beam of which a degree of divergence is less than that of the second beam.

With the above configuration, the focal length of the objective lens can be made short with allowing a sufficient operable distance even for an optical disc having a relatively thick protective layer.

Further to the above configuration, one surface of the objective lens is divided into a common area at a central portion and a high NA exclusive area at a peripheral portion surrounding the common area. A diffraction lens structure including a plurality of concentric annular zones having minute steps is formed in the high NA exclusive area. The diffraction lens structure compensating for aberrations of a portion of the first laser beam passed therethrough, while the diffraction lens structure causes aberrations to a portion of the second laser beam passed therethrough. The first laser beam passed through the common area and the high NA exclusive area is converged on the first disc to form a beam spot. A portion of the second laser beam passed through the common area is converged on the second disc to form a beam spot, while a portion of the second laser beam passed through the high NA exclusive area is diffused on the second disc due to the aberrations.

Therefore, a sufficient NA can be set for each of the optical discs without providing an aperture stop on the beam incident side of the objective lens.

According to another aspect of the invention, there is provided an objective lens for an optical head of an optical disc drive. The optical disc drive is capable of using at least a first disc and a second disc, which are different in terms of the thickness of the protective layer and data recording density. A protective layer of the second disc is thicker than that of the first disc, and a data density of the second disc is lower than that of the first disc. A first laser beam having a first wavelength and second laser beam having a second wavelength, which is longer than the first wavelength, are selectively incident on the objective lens, and the objective lens converges the first beam and the second beam on the first disc and the second disc, respectively, According to preferred embodiments, one surface of the objective lens is divided into a common area at a central portion and a high NA exclusive area at a peripheral portion surrounding the common area, and a diffraction lens structure including a plurality of concentric annular zones having minute steps is formed in the high NA exclusive area. The diffraction lens structure compensates for aberrations of a portion of the first beam passed therethrough, while the diffraction lens structure causes aberrations to a portion of the second laser beam passed therethrough. The first laser beam passed through the common area and the high NA exclusive area being converged on the first disc to form a beam spot. A portion of the second laser beam passed through the common area is converged on the second disc to form a beam spot, while the portion of the second laser beam passed through the high NA exclusive area is diffused on the second disc due to the aberration caused by the diffraction lens structure.

Optionally, in the above configurations, the diffraction lens structure formed in the high NA exclusive area may be formed to vary a spherical aberration depending on the wavelength of light passed therethrough.

Further optionally, the common area may be configured to be a continuous surface without stepped portions.

Alternatively, the common area may be formed with a diffraction lens structure including a plurality of concentric annular zones having minute steps.

In this case, the diffraction lens structure formed in the common area may be configured to compensate for a chromatic aberration.

Still optionally, the first laser beam incident on the objective lens may be a diverging light beam, a parallel light beam, or a converging light beam.

DESCRIPTION OF THE EMBODIMENTS

Hereinafter, optical systems for an optical head according to embodiments of the present invention will be described with reference to the accompanying drawings.

Firstly, an overall structure of an optical system will be described, and then, optical systems according to respective embodiments will be described.

An optical head according to each embodiment is used to perform data recording/readout of data on two types of optical discs having different data recording densities. In the embodiments described hereinafter, the optical head is capable of performing data recording/read out of a DVD (digital versatile disc), which has a relatively high data recording density, and a CD or a CD-R, which has a relatively low data density.

Figure 1:
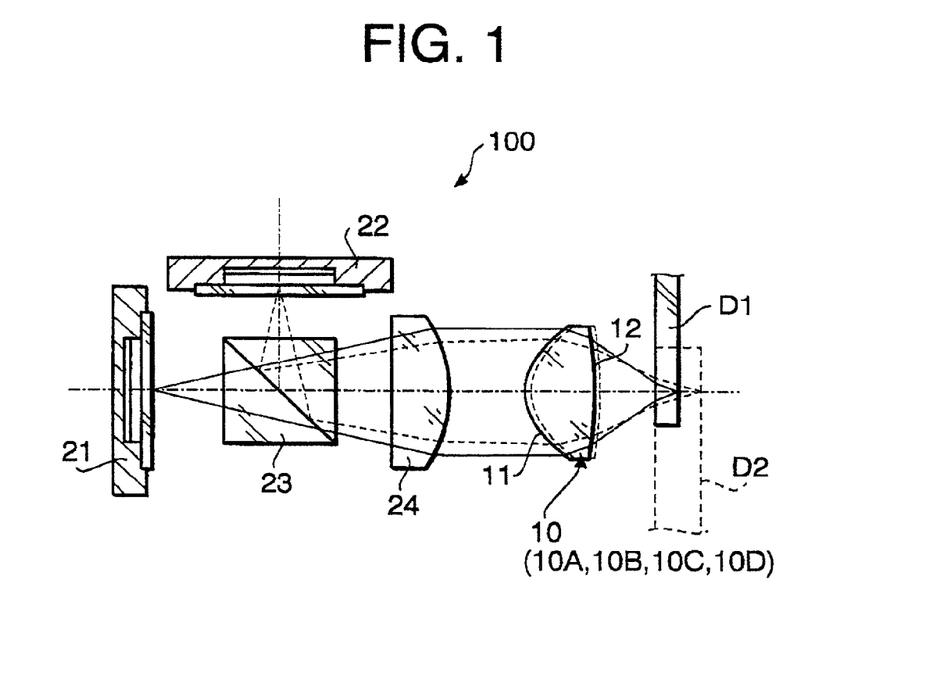
FIG. 1 schematically shows a structure of an optical system for an optical head, according to a first embodiment of the invention.

FIG. 1 schematically shows a structure of an optical system 100. The optical system 100 includes a first laser module 21, a second laser module 22, a beam splitter 23, a collimating lens 24, and an objective lens 10.

Each of the laser modules 21 and 22 is a device provided with a laser diode and a photo sensor integrally.

The objective lens 10 is configured to be movable in a direction of its optical axis with a well-known focusing mechanism. Further, the objective lens 10 is movable in a radial direction of the optical disc with a well-known tracking mechanism.

In order to use a first optical disc D1 having a high data recording density and a relatively thin protective layer (0.6 mm), such as the DVD, a red light beam, whose wavelength is within a range from 635 nm to 665 nm, is required in order to form a small beam spot on the data recording surface of the optical disc D1. In order to use a second optical disc D2 having a low data recording density and a relatively thick protective layer (1.20 mm), such as the CD or CD-R, another beam having a longer wavelength is used. In particular, when the CD-R is used, due to its spectral reflectivity, a near infrared light beam is required. In the optical system 100, the first laser module 21 is provided with a laser diode emitting a 650 nm laser beam, and the second laser module 22 is provided with a laser diode emitting a 780 nm laser beam.

In the arrangement shown in FIG. 1, the first laser module 21 is arranged such that the light emitting point thereof coincides with a front focal point of the collimating lens 24 so that a first light beam emerging from the collimating lens 24 is incident on the objective lens 10 as parallel light. Thus, an object distance of the objective lens 10 is infinity.

The second laser module 22 is arranged such that the light emitting point thereof is located on the collimating lens side with respect to the front focal point of the collimating lens 24 so that a second light beam emerging from the collimating lens 24 is incident on the objective lens 10 as diverging light. Thus, an object distance of the objective lens 10 is finite.

It should be noted that, in FIG. 1, a first laser beam emitted by the first laser module 21 is incident on the objective lens 20 as a parallel light beam. However, the invention is not limited to such a configuration, and the first beam incident on the objective lens 10 may be a slightly converging beam or a slightly diverging beam, degree of divergence of the first beam being less than that of the second laser beam.

When the first optical disc D1 (which is indicated by solid lines in FIG. 1) is used, the first laser module 21 is actuated. In this case, the objective lens 10 is arranged at a position indicated by solid lines in FIG. 1. The first laser beam (wavelength: 650 nm) emitted by the laser diode of the first laser module 21 is incident on the objective lens 10 as indicated by solid lines in FIG. 1, and converged by the objective lens 10 to form a beam spot on the data recording surface of the first optical disc D1.

When the second optical disc D2 (which is indicated by broken lines in FIG. 1) is used, the second laser module 22 is actuated. In this case, the objective lens 10 is located at a position indicated by broken lines in FIG. 1, which is closer to the optical disc than the position indicated by the solid line. The second laser beam (wavelength: 780 nm) emitted by the laser diode of the second laser module 22 is incident on the objective lens 10 as a diverging beam, which is converged by the objective lens 10 to form a beam spot on the data recording surface of the second optical disc D2.

The laser beam reflected by the first optical disc D1 or the second optical disc D2 passes through the objective lens 10, collimating lens 24 and the beam splitter 23, and is received by the photo sensor included in the first laser module 21 or the second laser module 22. Based on the output of the photo sensor, a focusing error signal, a tracking error signal and, when data is readout, data reproducing signal are detected.

Figures 2A, 2B:
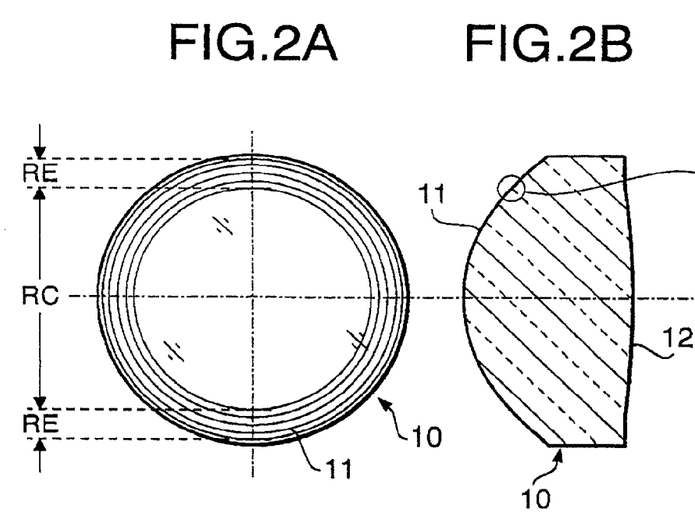
FIG. 2A is a front view of an objective lens of the optical system.
FIG. 2B is a cross sectional side view of the objective lens shown in FIG. 2A.
Figure 2C:
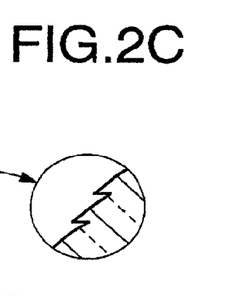
FIG. 2C is a partially enlarged cross sectional side view of the objective lens shown in FIG. 2A.

As described above, by making the beam as a diverging beam when the second disc D2 is used, a distance between a beam spot and the objective lens 10 can be made longer in comparison with a case where the parallel beam emerges from the collimating lens 24. Therefore, even though the focal length of the objective lens 10 is relatively short, a sufficient working distance can be obtained when the second optical disc D2 is used. Accordingly, by employing the above-described configuration, the thickness of the entire optical system 100 can be reduced FIGS. 2A–2C show the structure of the objective lens 10. FIG. 2A is a front view, FIG. 2B is a cross sectional side view and FIG. 2C is a partially enlarged cross sectional side view of the objective lens 10.

The objective lens 10 is a biconvex plastic lens having first and second aspherical surfaces 11 and 12. The first surface 11 is divided into a common area RC at a central portion and a high NA exclusive area RE that is on the outer (i.e., peripheral) side of the common area RC. The common area RC contributes to converging of a light beam at a low NA (approximately 0.45 through 0.50), which is necessary and sufficient for the second optical disc D2. The high NA exclusive area RE contributes to convergence of a light beam at a high NA (approximately 0.60), which is only necessary for the first optical disc D1.

On the first surface 11, within the high NA exclusive area RE, a diffraction lens structure including a plurality of stepped concentric annular zones, as shown in FIGS. 2A and 2C, is formed. The stepped portions (i.e., the boundaries between adjacent annular zones) extend in the direction parallel with the optical axis. The common area RC of the first surface 11, and the second surface 12 are continuous surfaces, respectively, and are not formed with such diffraction lens structures having stepped portions.

The characteristic of the diffraction lens structure formed in the high NA exclusive area RE is variable, in terms of spherical aberration, depending on the wavelength. When the first laser beam is converged on the first optical disc D1, the diffraction lens structure well compensates for the spherical aberration, while, when the second laser beam is converged on the second disc D2, the diffraction lens structure generates spherical aberration with respect to part of the second laser beam passed through the high NA exclusive area RE.

Accordingly, when the first disc D1 is used, part of the first laser beam passed through the common area RC and part of the first laser beam passed through the high NA exclusive area are converged on the same point on the first disc D1, thereby the high NA being achieved and a small beam spot being formed on the first optical disc D1. When the second disc D2 is used, a part of the second laser beam passed through the high NA exclusive area RE is diffused on the disc D2 and only the part of the second laser beam passed through the common area RC is converged on the second disc D2. Thus, the relatively small NA is achieved, and a relatively large beam spot (which is sufficient for the second optical disc D2) is formed on the second optical disc D2.

It should be noted that, in the above-described configuration, the diffraction lens structure is formed only in the high NA exclusive area on the first surface 11. However, the invention is not limited to such a configuration, and various modification can be made. For example, another diffraction lens structure may be formed on the common area RC to compensate for aberration, e.g., chromatic aberration. Further, the diffraction lens structure may be formed on the second surface 12 instead of the first surface 11.

NUMERICAL EMBODIMENTS

Hereinafter, five numerical embodiments will be indicated.

First Embodiment

Figure 3:
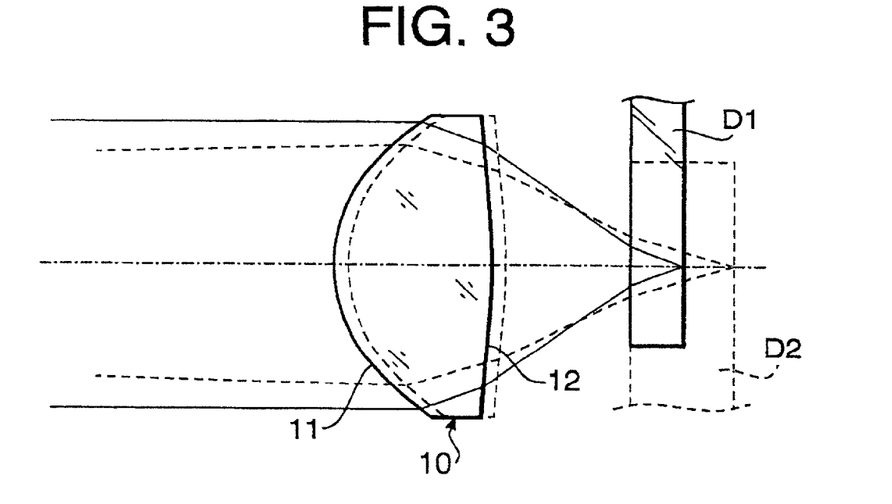
FIG. 3 schematically shows an arrangement of an objective lens and an optical disc according to a first embodiment.

A first numerical embodiment is applied to the structure shown in FIG. 3. In FIG. 3, the objective lens 10, the first optical disc D1 and the second optical disc D2 are shown. The numerical values are indicated in TABLE 1.

In the first embodiment, the first surface 11 is divided into the common area RC and the high NA exclusive area RE. The common area RC is defined as an area where $0 \leq h < 1.50$ (mm), and the high NA exclusive area RE is defined as an area where $1.50 \leq h$, wherein h represents a height with respect to the optical axis of the objective lens 10. The common area RC is a continuous surface without stepped portions, and the high NA exclusive area RE is formed with a diffraction lens structure, which varies the spherical aberration depending on the wavelength of the light passed therethrough.

The curvature of the common area RC and the base curve (the shape thereof as a refractive lens without the diffraction lens structure) of the high NA exclusive area RE are different aspherical surfaces respectively defined by different coefficients. The second surface 12 is a rotationally symmetrical aspherical surface, which is not formed with a diffraction lens structure.

The common area RC and the base curve of the high NA exclusive area RE of the first surface 11 are also the rotationally symmetrical aspherical surfaces. Generally, a rotationally symmetrical aspherical surface is expressed by the following equation:

$$X(h) = \frac{ch^2}{1+\sqrt{1-(1+K)c^2h^2}} + A_4h^4 + A_6h^6 + A_8h^8 + A_{10}h^{10} + A_{12}h^{12}$$

where,

X(h) is a SAG, that is, a distance of a point on a surface, whose height from the optical axis is h, with respect a plane tangential at the optical axis;

Symbol c represents a curvature (1/r) of the vertex of the surface;

K is a conical constant; and $A_4, A_6, A_8, A_{10}$ and $A_{12}$ are aspherical surface coefficients of fourth, sixth, eighth, tenth and twelfth orders, respectively.

An additional optical path length $\phi(h)$, which is added by the diffractive lens structure, is expressed by the following optical path difference function:

$$\phi(h) = (P_2h^2 + P_4h^4 + P_6h^6 + \ldots) \times m \times \lambda$$

where, $P_2, P_4$ and $P_6$ are coefficients of second, fourth and sixth orders;

h represents a height from the optical axis;

m represents a diffraction order: and $\lambda$ represents a working wavelength. The optical path difference $\phi(h)$ indicates a difference between an optical path length of a hypothetical ray of light which does not pass through the diffractive lens structure and an optical path length of a ray of light which is diffracted by the diffraction lens structure, at the height h from the optical axis. In other words, the optical path difference $\phi(h)$ represents the additional optical path length of each ray of light which is diffracted by the diffractive lens structure. The positive sign of the added length represents that the optical path length on the optical axis is elongated relative to the optical path length on the optical axis.

An actual microscopic shape of the diffractive lens structure is defined by subtracting $\lambda \times m$ (m: integer), i.e., an integral multiple of $\lambda$, from $\phi(h)$ to have a stepwise additional optical path length $\phi'(h)$, similar to the Fresnel lens. Specifically, the additional optical path length $\phi'(h)$ is expressed by the following formula.

$$\phi'(h) = (MOD(P_2h^2 + P_4h^4 + P_6h^6 + \ldots + CONST, 1) - CONST) \times \lambda_B$$

where, MOD is a modulo function, and $\lambda_B$ is a blazed wavelength, at which an optical path length difference generated by the minute step of the diffractive lens structure becomes equal to one wavelength, i.e., diffraction efficiency is maximized. The constant CONST defines a phase of a boundary between the annular zones and could be an arbitrary value satisfying a condition: $0 \leq CONST < 1$. It should be noted that the modulo function MOD (x, y) represents a remainder when x is divided by y.

When MOD $(P_2h^2 + P_4h^4 + P_6h^6 + \ldots + CONST, 1)$ is equal to zero, a position at the height h, from the optical axis, represents the position of the boundary between two annular zones.

In TABLE 1, coefficients defining the common area RC, the base curve of the high NA exclusive area RE, and the diffraction lens structure, distances between surface, refractive index for d-line, Abbe number vd, and coefficients defining the aspherical shape of the second surface 12 are indicated.

In TABLE 1, $NA_1, f_1, \lambda_1, WD_1$ and $OD_1$ are the numerical aperture, the focal length of the objective lens 10 (unit: mm), the wavelength (unit: nm), the working distance (unit: mm), the object distance (unit: mm) when the first disc D1 is used, respectively. Further, $NA_2, f_2, \lambda_2, WD_2$ and $OD_2$ are the numerical aperture, the focal length of the objective lens 10 (unit: mm), the wavelength (unit: nm), the working distance (unit: mm), the object distance (unit: mm) when the second disc D2 is used, respectively.

TABLE 1

$NA_1 = 0.60$ $f_1 = 3.00$ $\lambda_1 = 650$ $WD_1 = 1.61$ $OD_1 = \infty$
$NA_2 = 0.46$ $f_2 = 3.02$ $\lambda_2 = 780$ $WD_2 = 1.43$ $OD_1 = -52.0$

| | First surface | | |
|---|---|---|---|
| | Common area (0 ≤ h < 1.50) | High-NA exclusive area (1.50 ≤ h) | Second surface |
| r | 1.870 | 1.915 | −8.109 |
| K | −0.500 | −0.500 | 0.00 |
| $A_4$ | $-2.12 \times 10^{-4}$ | $-3.00 \times 10^{-4}$ | $1.68 \times 10^{-2}$ |
| $A_6$ | $1.47 \times 10^{-4}$ | $1.14 \times 10^{-3}$ | $-2.57 \times 10^{-3}$ |
| $A_8$ | $-8.23 \times 10^{-5}$ | $-8.30 \times 10^{-4}$ | $2.20 \times 10^{-4}$ |
| $A_{10}$ | $6.09 \times 10^{-5}$ | $3.20 \times 10^{-4}$ | $-1.68 \times 10^{-4}$ |
| $A_{12}$ | $-1.92 \times 10^{-5}$ | $-5.14 \times 10^{-5}$ | $2.93 \times 10^{-5}$ |
| $P_2$ | — | −5.23 | — |
| $P_4$ | — | 0.00 | — |
| $P_6$ | — | 0.00 | — |
| $P_8$ | — | 0.00 | — |
| $P_{10}$ | — | 0.00 | — |
| $P_{12}$ | — | 0.00 | — |
| d (distance between first and second surfaces | | 1.80 | |
| nd (refractive index of objective lens) | | 1.5436 | |
| vd (Abbe number of objective lens) | | 55.7 | |
| nd (refractive index of optical disc) | | 1.5855 | |
| vd (Abbe number of optical disc) | | 29.9 | |

Figure 4A:
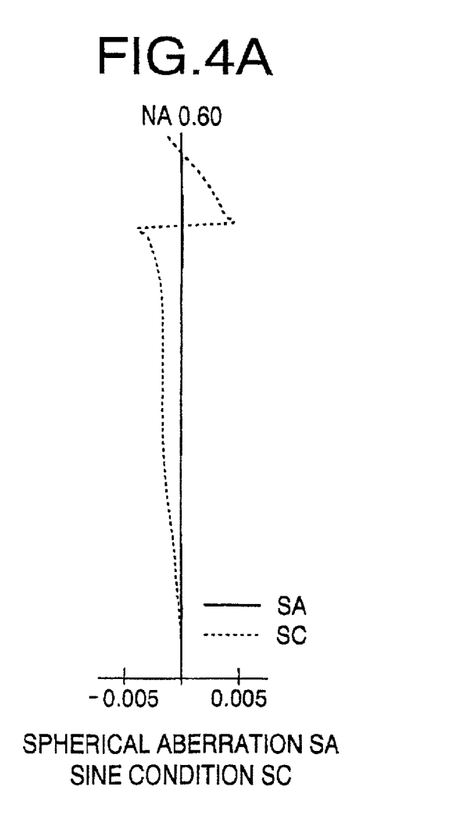
FIGS. 4A and 4B are graphs respectively showing spherical aberration and chromatic aberration according to the first embodiment, when a first optical disc is used.
Figure 4B:
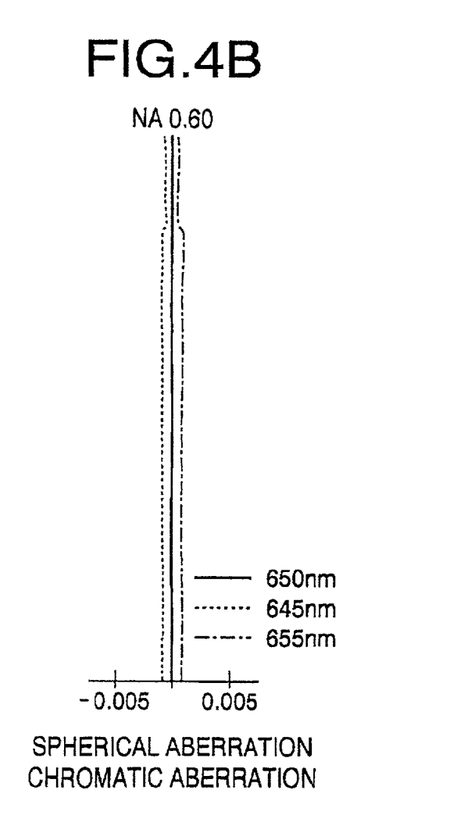

FIG. 4A shows a spherical aberration SA and a sine condition SC of the objective lens according to the first embodiment, with respect to the first optical disc D1, at the wavelength of 650 nm. FIG. 4B shows chromatic aberrations represented by spherical aberrations at wavelengths of 650 nm, 645 nm and 655 nm. The horizontal axis of each graph represents the occurrence of the aberration (unit: mm), and the vertical axis represents the numerical aperture NA.

When the first optical disc D1 is used, the first laser beam (wavelength: 650 nm) is made incident on the objective lens 10 as parallel light (object distance: ∞). In this case, the high NA exclusive area RE functions to compensate for the aberration. Therefore, part of the laser beam passed through the common area RC and the part of the laser beam passed through the high NA exclusive area RE converge at a single point to form a beam spot, which is sufficiently small for data recording/readout on the first disc D1.

Figure 5A:
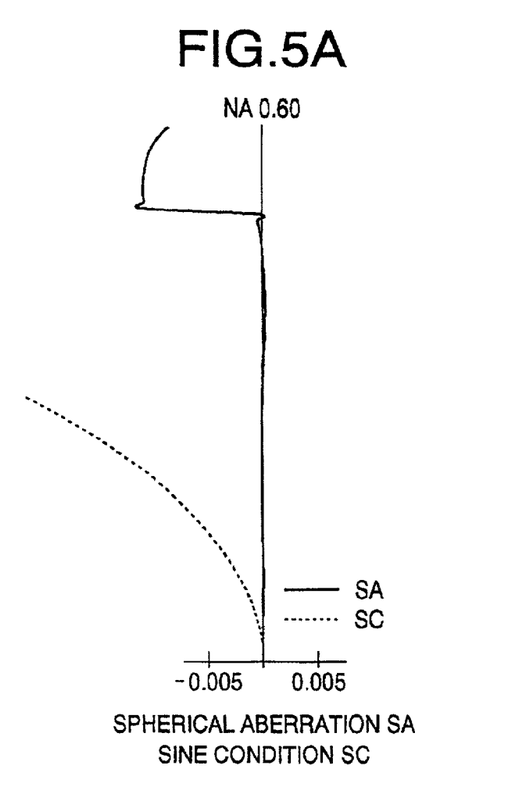
FIGS. 5A and 5B are graphs respectively showing spherical aberration and chromatic aberration according to the first embodiment, when a second optical disc is used.
Figure 5B:
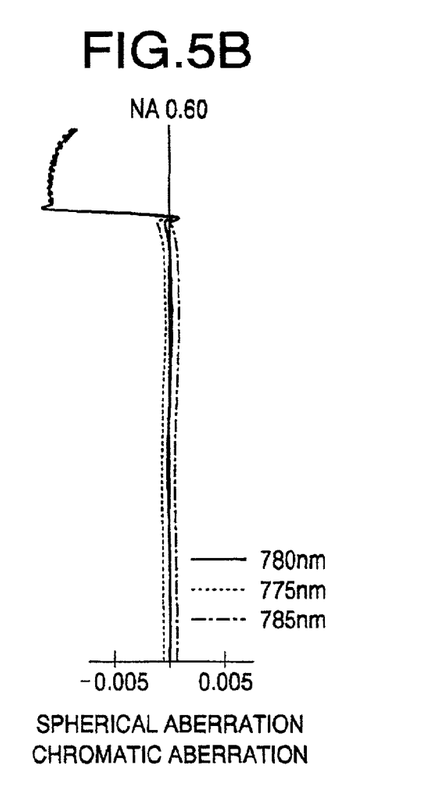

FIG. 5A shows a spherical aberration SA and a sine condition SC of the objective lens according to the first embodiment, with respect to the second optical disc D2, at the wavelength of 780 nm. FIG. 5B shows chromatic aberrations represented by spherical aberrations at wavelengths of 780 nm, 775 nm and 785 nm.

Figure 6A:
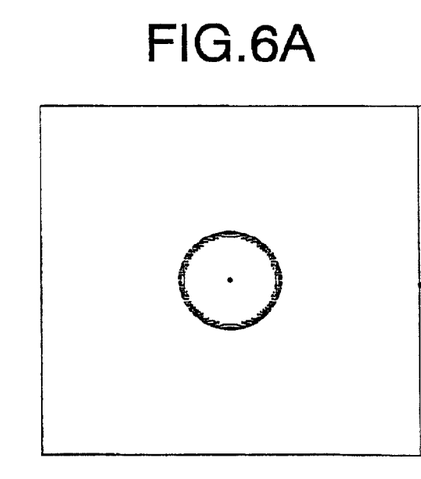
FIGS. 6A and 6B respectively show a spot diagram and a graph showing an intensity distribution according to the first embodiment, when a second optical disc is used.
Figure 6B:
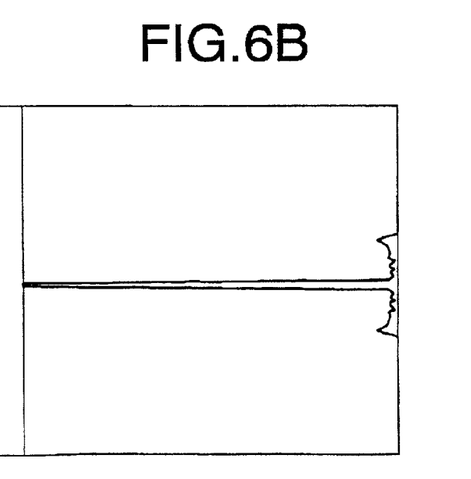

When the second optical disc D2 is used, the second laser beam (wavelength: 780 nm) is incident on the objective lens as diverging light fluxes (object distance: −52.0 mm). In this case, the high NA exclusive area RE generates the spherical aberration as shown in FIG. 5A. Therefore, as shown in a spot diagram (FIG. 6A) and the intensity distribution (FIG. 6B), only the portion of the laser beam passed through the common area RC forms a beam spot suitable for data recording/readout on the second optical disc D2. The portion of the laser beam passed through the high NA exclusive area RE is diffused, on the disc D2, within an annular area spaced from the beam spot.

It should be noted that, in FIG. 3, the second laser beam is represented by a beam which only impinges on the common area RC. In FIG. 3, only the portion contributing to form the beam spot on the second disc D2 is indicated. In practical use, the second laser beam is also incident on the high NA exclusive area RE. However, due to the characteristic of the diffraction lens structure formed in the high NA exclusive area RE, the laser beam passed therethrough is diverged and does not contribute to form a beam spot. Therefore, in FIG. 3, the portion of the laser beam incident on the high NA exclusive area RE is not shown (similarly, in the following embodiments).

Second Embodiment

TABLE 2 indicates numerical structure of an objective lens 10A, which replaces the objective lens 10 in FIG. 3, in accordance with a second embodiment of the invention. The configuration of the second embodiment is substantially the same except for the structure in the high NA exclusive area RE.

TABLE 2

$NA_1 = 0.60\ f_1 = 3.00\ \lambda_1 = 650\ WD_1 = 1.61\ OD_1 = \infty$
$NA_2 = 0.46\ f_2 = 3.02\ \lambda_2 = 780\ WD_2 = 1.43\ OD_1 = -52.0$

| | First surface | | |
|---|---|---|---|
| | Common area ($0 \leq h < 1.50$) | High-NA exclusive area ($1.50 \leq h$) | Second surface |
| r | 1.870 | 1.904 | −8.109 |
| κ | −0.500 | −0.500 | 0.00 |
| $A_4$ | $-2.12 \times 10^{-4}$ | $1.92 \times 10^{-3}$ | $1.68 \times 10^{-2}$ |
| $A_6$ | $1.47 \times 10^{-4}$ | $1.49 \times 10^{-3}$ | $-2.57 \times 10^{-3}$ |
| $A_8$ | $-8.23 \times 10^{-5}$ | $-1.02 \times 10^{-3}$ | $2.20 \times 10^{-4}$ |
| $A_{10}$ | $6.09 \times 10^{-5}$ | $3.95 \times 10^{-4}$ | $-1.68 \times 10^{-4}$ |
| $A_{12}$ | $-1.92 \times 10^{-5}$ | $-6.14 \times 10^{-5}$ | $2.93 \times 10^{-5}$ |
| $P_2$ | — | −3.97 | — |
| $P_4$ | — | 2.00 | — |
| $P_6$ | — | 0.00 | — |
| $P_8$ | — | 0.00 | — |
| $P_{10}$ | — | 0.00 | — |
| $P_{12}$ | — | 0.00 | — |
| d (distance between first and second surfaces | | | 1.80 |
| nd (refractive index of objective lens) | | | 1.5436 |
| vd (Abbe number of objective lens) | | | 55.7 |
| nd (refractive index of optical disc) | | | 1.5855 |
| vd (Abbe number of optical disc) | | | 29.9 |

Figure 7A:
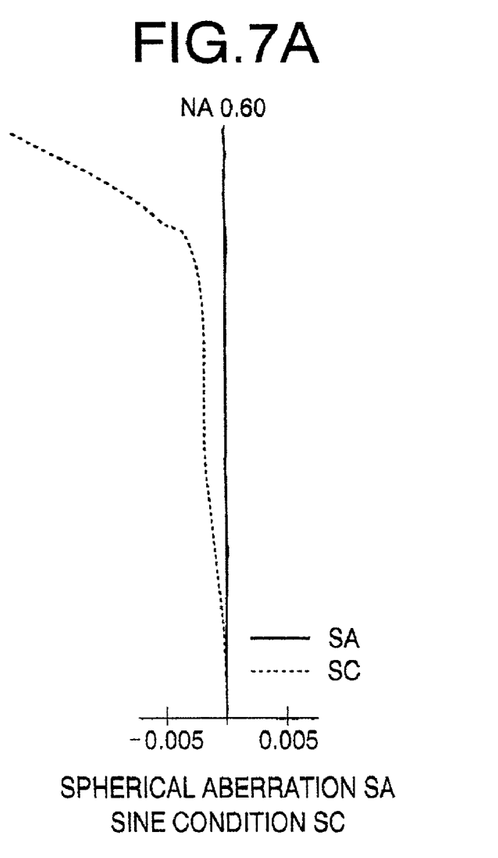
FIGS. 7A and 7B are graphs respectively showing spherical aberration and chromatic aberration according to a second embodiment, when a first optical disc is used.
Figure 7B:
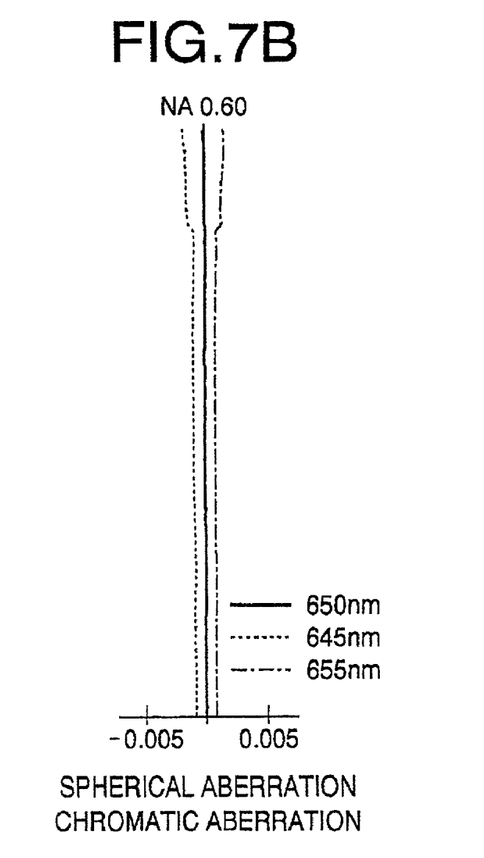

FIG. 7A shows a spherical aberration SA and a sine condition SC of the objective lens according to the second embodiment, with respect to the first optical disc D1, at the wavelength of 650 nm. FIG. 7B shows chromatic aberrations represented by spherical aberrations at wavelengths of 650 nm, 645 nm and 655 nm.

When the first optical disc D1 is used, the first laser beam (wavelength: 650 nm) is made incident on the objective lens 10A as parallel light (object distance: ∞). In this case, the high NA exclusive area RE functions to compensate for the aberration. Therefore, part of the laser beam passed through the common area RC and the part of the laser beam passed through the high NA exclusive area RE converge at a single point to form a beam spot, which is sufficiently small for data recording/readout on the first disc D1.

Figure 8A:
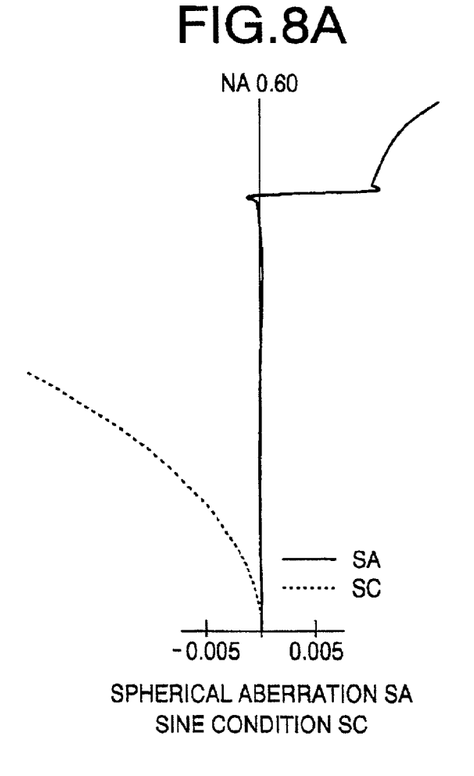
FIGS. 8A and 8B are graphs respectively showing spherical aberration and chromatic aberration according to the second embodiment, when a second optical disc is used.
Figure 8B:
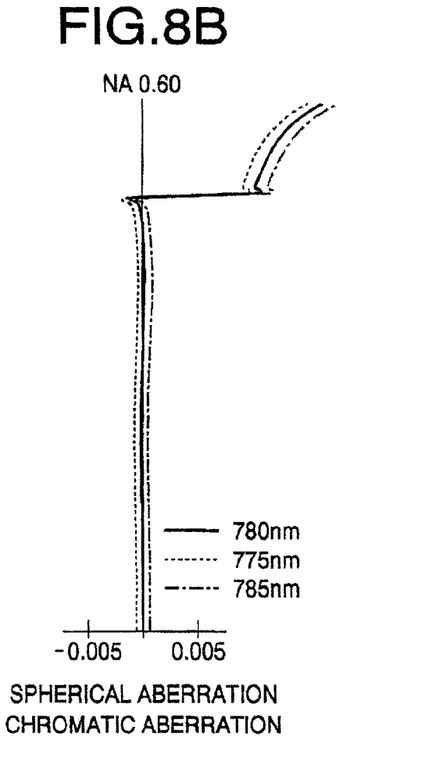

FIG. 8A shows a spherical aberration SA and a sine condition SC of the objective lens according to the second embodiment, with respect to the second optical disc D2, at the wavelength of 780 nm. FIG. 8B shows chromatic aberrations represented by spherical aberrations at wavelengths of 780 nm, 775 nm and 785 nm.

Figure 9A:
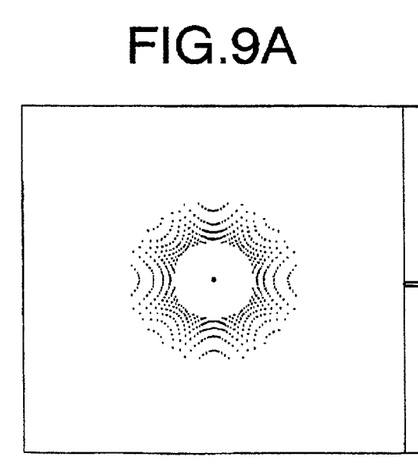
FIGS. 9A and 9B respectively show a spot diagram and a graph showing an intensity distribution according to the second embodiment, when a second optical disc is used.
Figure 9B:
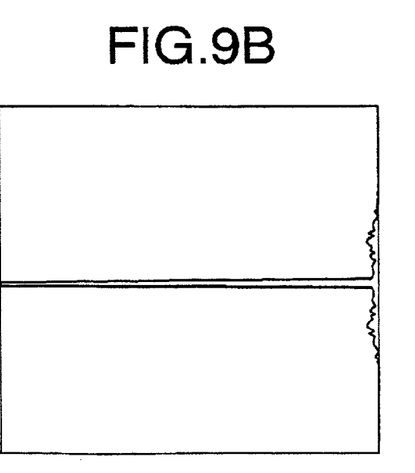

When the second optical disc D2 is used, the second laser beam (wavelength: 780 nm) is incident on the objective lens as diverging light fluxes (object distance: −52.0 mm). In this case, the high NA exclusive area RE generates the spherical aberration as shown in FIG. 8A. Therefore, as shown in a spot diagram (FIG. 9A) and the intensity distribution (FIG. 9B), only the portion of the laser beam passed through the common area RC forms a beam spot suitable for data recording/readout on the second optical disc D2. The portion of the laser beam passed through the high NA exclusive area RE is diffused, on the disc D2, within an annular area spaced from the beam spot.

Third Embodiment

Figure 10:
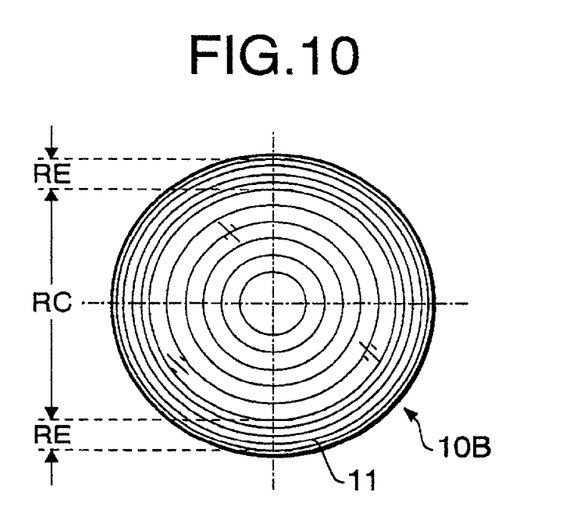
FIG. 10 schematically shows an arrangement of an objective lens and an optical disc according to a third embodiment.

FIG. 10 shows a front view of an objective lens 10B, which replaces the objective lens 10 in FIG. 3, according to a third embodiment. Similarly to the first and second embodiments, the first surface 11 of the objective lens 10B is divided into the common area RC ($0 \leq h < 1.50$) and the high NA exclusive area RE ($1.50 \leq h$). In the high NA exclusive area RE, a diffraction lens structure which varies the spherical aberration depending on the wavelength of the light passing therethrough is provided. According to the third embodiment, another diffraction lens structure is formed in the common area RC to compensate for a chromatic aberration. The second surface 12 of the objective lens 10B is a rotationally symmetrical aspherical surface without a diffraction lens structure.

TABLE 3 indicates a numerical structure of the objective lens 10B according to the third embodiment.

TABLE 3

$NA_1 = 0.60\ f_1 = 3.00\ \lambda_1 = 650\ WD_1 = 1.63\ OD_1 = \infty$
$NA_2 = 0.46\ f_2 = 3.02\ \lambda_2 = 780\ WD_2 = 1.45\ OD_1 = -52.0$

| | First surface | | |
|---|---|---|---|
| | Common area ($0 \leq h < 1.50$) | High-NA exclusive area ($1.50 \leq h$) | Second surface |
| r | 1.935 | 1.926 | −7.075 |
| κ | −0.500 | −0.500 | 0.00 |
| $A_4$ | $-5.14 \times 10^{-4}$ | $7.55 \times 10^{-4}$ | $2.61 \times 10^{-2}$ |
| $A_6$ | $6.75 \times 10^{-4}$ | $3.00 \times 10^{-6}$ | $-7.19 \times 10^{-3}$ |
| $A_8$ | $-1.36 \times 10^{-4}$ | $-3.27 \times 10^{-4}$ | $4.83 \times 10^{-4}$ |
| $A_{10}$ | $4.17 \times 10^{-5}$ | $8.90 \times 10^{-5}$ | $7.91 \times 10^{-5}$ |
| $A_{12}$ | $-2.00 \times 10^{-5}$ | $-2.68 \times 10^{-5}$ | $-1.50 \times 10^{-5}$ |
| $P_2$ | −2.00 | $-9.97 \times 10^{-1}$ | — |
| $P_4$ | −1.54 | $-3.60 \times 10^{-1}$ | — |
| $P_6$ | $3.70 \times 10^{-1}$ | $-4.00 \times 10^{-1}$ | — |
| $P_8$ | 0.00 | 0.00 | — |
| $P_{10}$ | 0.00 | 0.00 | — |
| $P_{12}$ | 0.00 | 0.00 | — |
| d (distance between first and second surfaces | | | 1.80 |
| nd (refractive index of objective lens) | | | 1.5436 |
| vd (Abbe number of objective lens) | | | 55.7 |
| nd (refractive index of optical disc) | | | 1.5855 |
| vd (Abbe number of optical disc) | | | 29.9 |

Figures 11A, 11B:
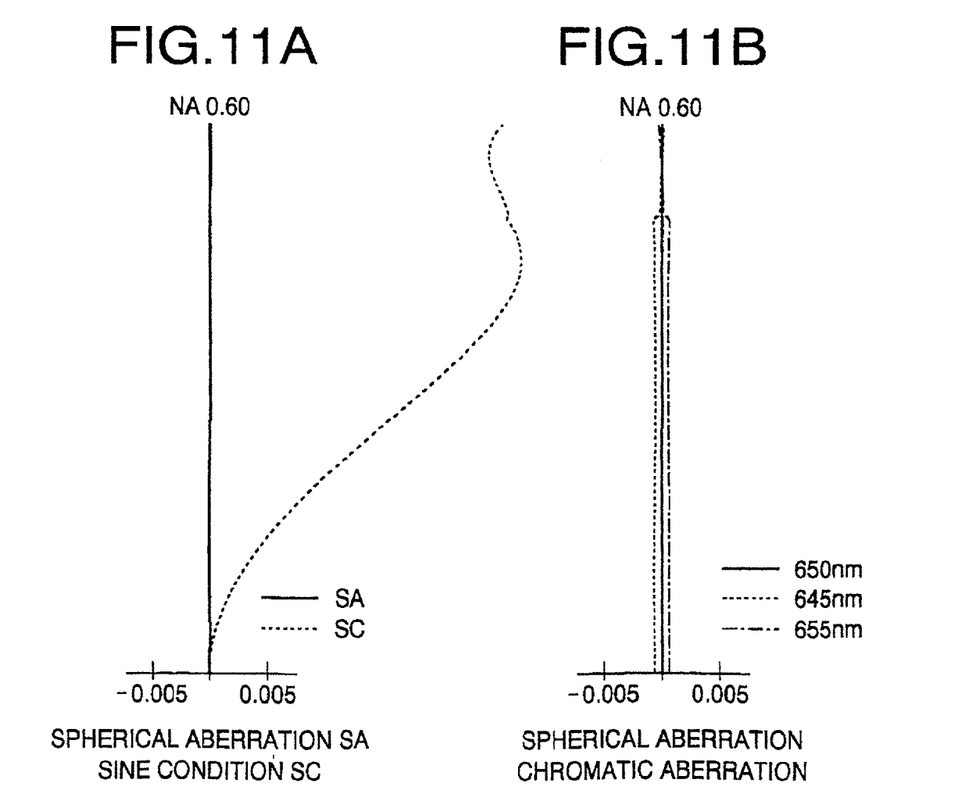
FIGS. 11A and 11B are graphs respectively showing spherical aberration and chromatic aberration according to the third embodiment, when a first optical disc is used.

FIG. 11A shows a spherical aberration SA and a sine condition SC of the objective lens according to the third embodiment, with respect to the first optical disc D1, at the wavelength of 650 nm. FIG. 11B shows chromatic aberrations represented by spherical aberrations at wavelengths of 650 nm, 645 nm and 655 nm.

When the first optical disc D1 is used, the first laser beam (wavelength: 650 nm) is incident on the objective lens 10B as parallel light (object distance: ∞). In this case, the high NA exclusive area RE functions to compensate for the aberration. Therefore, part of the laser beam passed through the common area RC and the part of the laser beam passed through the high NA exclusive area RE converge at a single point to form a beam spot, which is sufficiently small for data recording/readout on the first disc D1.

Figure 12A:
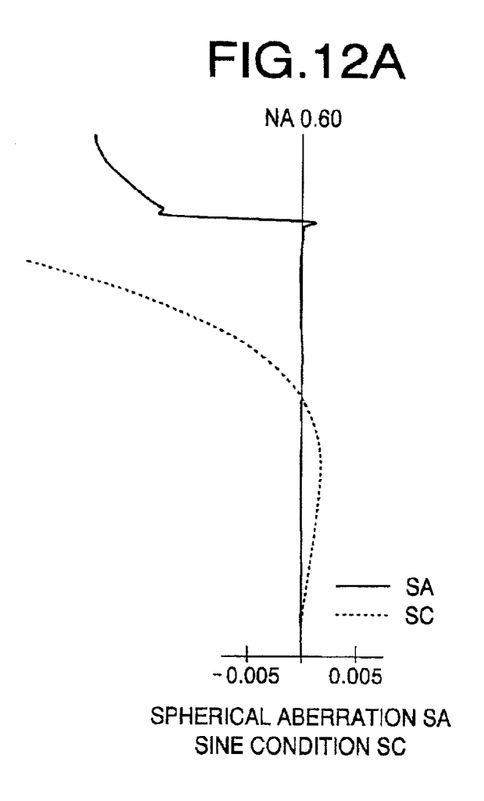
FIGS. 12A and 12B are graphs respectively showing spherical aberration and chromatic aberration according to the third embodiment, when a second optical disc is used.
Figure 12B:
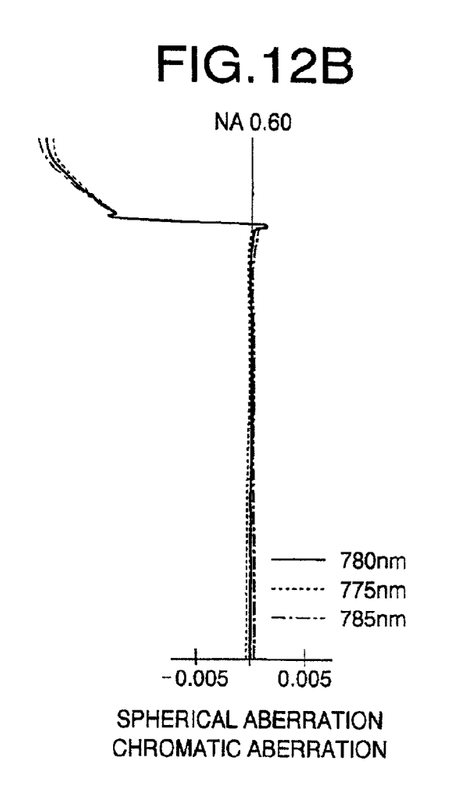

FIG. 12A shows a spherical aberration SA and a sine condition SC of the objective lens according to the third embodiment, with respect to the second optical disc D2, at the wavelength of 780 nm. FIG. 12B shows chromatic aberrations represented by spherical aberrations at wavelengths of 780 nm, 775 nm and 785 nm.

Figure 13A:
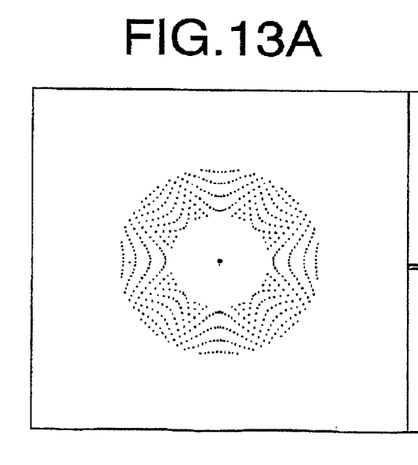
FIGS. 13A and 13B respectively show a spot diagram and a graph showing an intensity distribution according to the third embodiment, when a second optical disc is used.
Figure 13B:
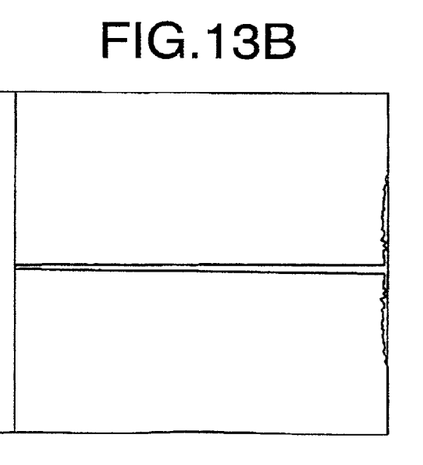

When the second optical disc D2 is used, the second laser beam (wavelength: 780 nm) is incident on the objective lens as diverging light fluxes (object distance: −52.0 mm). In this case, the high NA exclusive area RE generates the spherical aberration as shown in FIG. 12A. Therefore, as shown in a spot diagram (FIG. 13A) and the intensity distribution (FIG. 13B), only the portion of the laser beam passed through the common area RC forms a beam spot suitable for data recording/readout on the second optical disc D2. The portion of the laser beam passed through the high NA exclusive area RE is diffused, on the disc D2, within an annular area spaced from the beam spot.

Fourth Embodiment

Figure 14:
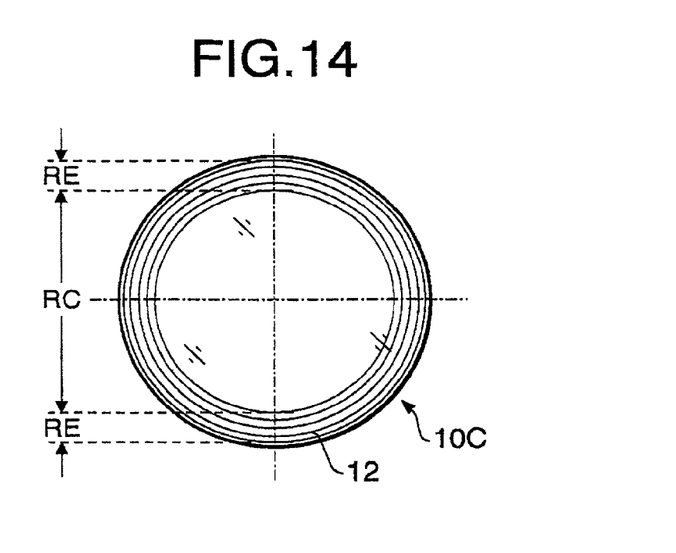
FIG. 14 schematically shows an arrangement of an objective lens and an optical disc according to a fourth embodiment.

FIG. 14 shows a rear view of an objective lens 10C, which replaces the objective lens 10 in FIG. 3, according to a fourth embodiment. In the fourth embodiment, the second surface 12 of the objective lens 10C is divided into the common area RC ($0 \leq h < 1.20$) and the high NA exclusive area RE ($1.20 \leq h$), and in the high NA exclusive area RE, a diffraction lens structure which varies the spherical aberration depending on the wavelength of the light passing therethrough is formed. The first surface 11 of the objective lens 10C is a rotationally symmetrical aspherical surface without a diffraction lens structure.

TABLE 4 indicates a numerical structure of the objective lens 10C according to the fourth embodiment.

TABLE 4

$NA_1 = 0.60$ $f_1 = 3.00$ $\lambda_1 = 650$ $WD_1 = 1.61$ $OD_1 = \infty$
$NA_2 = 0.46$ $f_2 = 3.02$ $\lambda_2 = 780$ $WD_2 = 1.44$ $OD_1 = -52.0$

| | First surface | Second surface Common area ($0 \leq h < 1.20$) | High-NA exclusive area ($1.20 \leq h$) |
|---|---|---|---|
| r | 1.882 | −7.816 | −7.439 |
| κ | −0.500 | 0.000 | −0.500 |
| $A_4$ | $-3.53 \times 10^{-4}$ | $1.66 \times 10^{-2}$ | $1.76 \times 10^{-2}$ |
| $A_6$ | $2.62 \times 10^{-5}$ | $-3.35 \times 10^{-3}$ | $-1.94 \times 10^{-3}$ |
| $A_8$ | $-1.04 \times 10^{-4}$ | $-1.18 \times 10^{-4}$ | $-2.73 \times 10^{-4}$ |
| $A_{10}$ | $3.05 \times 10^{-5}$ | $1.48 \times 10^{-4}$ | $1.50 \times 10^{-4}$ |
| $A_{12}$ | $-1.56 \times 10^{-5}$ | $-2.83 \times 10^{-5}$ | $-1.69 \times 10^{-5}$ |
| $P_2$ | — | — | 2.70 |
| $P_4$ | — | — | $-5.00 \times 10^{-1}$ |
| $P_6$ | — | — | −1.23 |
| $P_8$ | — | — | 0.00 |
| $P_{10}$ | — | — | 0.00 |
| $P_{12}$ | — | — | 0.00 |
| d (distance between first and second surfaces) | | | 1.80 |
| nd (refractive index of objective lens) | | | 1.5436 |
| vd (Abbe number of objective lens) | | | 55.7 |

TABLE 4-continued $NA_1 = 0.60$ $f_1 = 3.00$ $\lambda_1 = 650$ $WD_1 = 1.61$ $OD_1 = \infty$
$NA_2 = 0.46$ $f_2 = 3.02$ $\lambda_2 = 780$ $WD_2 = 1.44$ $OD_1 = -52.0$

| | First surface | Second surface Common area ($0 \leq h < 1.20$) | High-NA exclusive area ($1.20 \leq h$) |
|---|---|---|---|
| nd (refractive index of optical disc) | | | 1.5855 |
| vd (Abbe number of optical disc) | | | 29.9 |

Figure 15A:
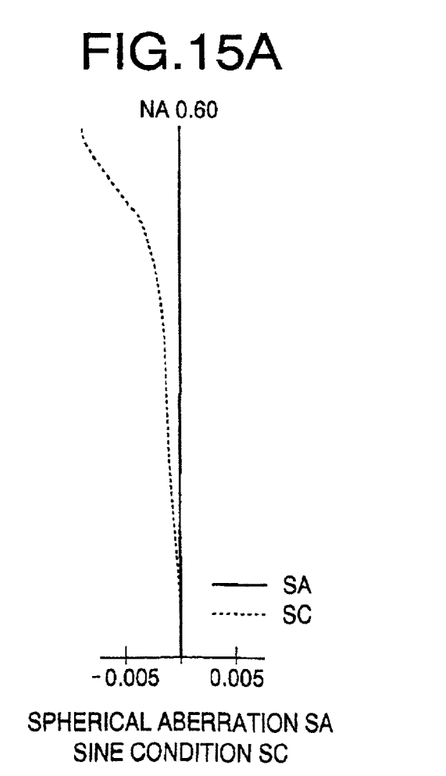
FIGS. 15A and 15B are graphs respectively showing spherical aberration and chromatic aberration according to the fourth embodiment, when a first optical disc is used.
Figure 15B:
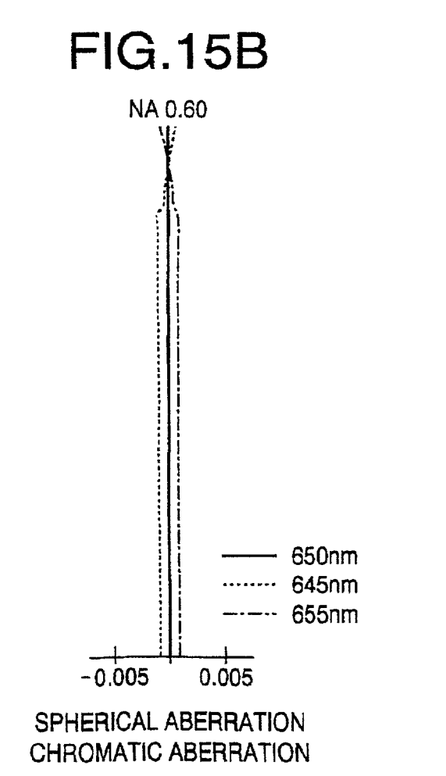

FIG. 15A shows a spherical aberration SA and a sine condition SC of the objective lens according to the fourth embodiment, with respect to the first optical disc D1, at the wavelength of 650 nm. FIG. 15B shows chromatic aberrations represented by spherical aberrations at wavelengths of 650 nm, 645 nm and 655 nm.

When the first optical disc D1 is used, the first laser beam (wavelength: 650 nm) is incident on the objective lens 10C as parallel light (object distance: ∞). In this case, the high NA exclusive area RE functions to compensate for the aberration. Therefore, part of the laser beam passed through the common area RC and the part of the laser beam passed through the high NA exclusive area RE converge at a single point to form a beam spot, which is sufficiently small for data recording/readout on the first disc D1.

Figure 16A:
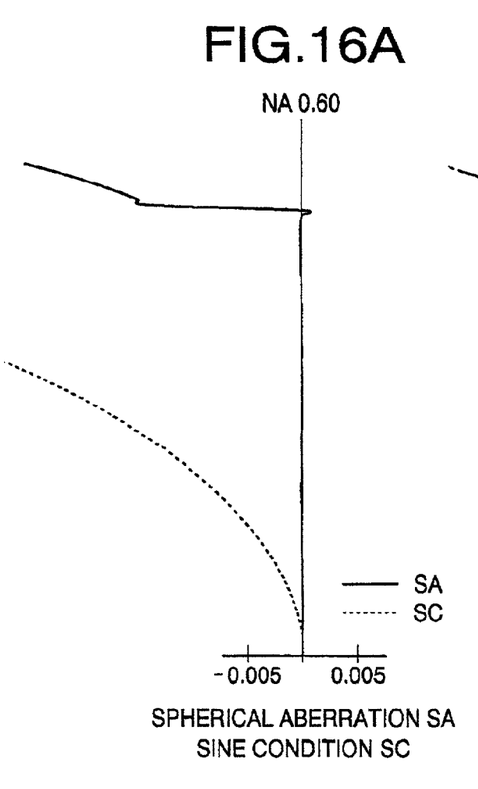
FIGS. 16A and 16B are graphs respectively showing spherical aberration and chromatic aberration according to the fourth embodiment, when a second optical disc is used.
Figure 16B:
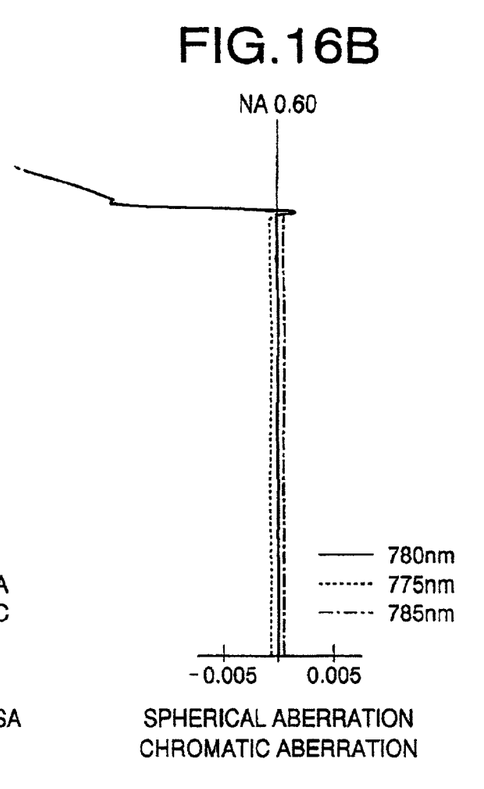

FIG. 16A shows a spherical aberration SA and a sine condition SC of the objective lens according to the fourth embodiment, with respect to the second optical disc D2, at the wavelength of 780 nm. FIG. 16B shows chromatic aberrations represented by spherical aberrations at wavelengths of 780 nm, 775 nm and 785 nm.

Figure 17A:
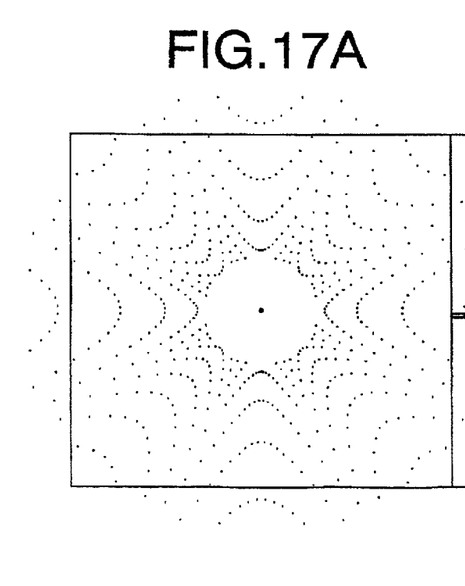
FIGS. 17A and 17B respectively show a spot diagram and a graph showing an intensity distribution according to the fourth embodiment, when a second optical disc is used.
Figure 17B:
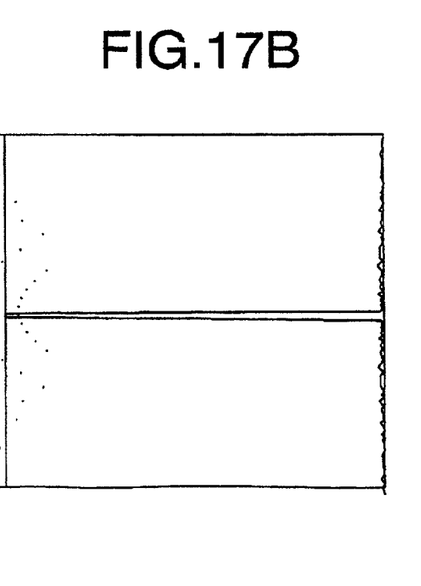

When the second optical disc D2 is used, the second laser beam (wavelength: 780 nm) is incident on the objective lens as diverging light fluxes (object distance: −52.0 mm). In this case, the high NA exclusive area RE generates the spherical aberration as shown in FIG. 16A. Therefore, as shown in a spot diagram (FIG. 17A) and the intensity distribution (FIG. 17B), only the portion of the laser beam passed through the common area RC forms a beam spot suitable for data recording/readout on the second optical disc D2. The portion of the laser beam passed through the high NA exclusive area RE is diffused, on the disc D2, within an annular area spaced from the beam spot.

Fifth Embodiment

Figure 18:
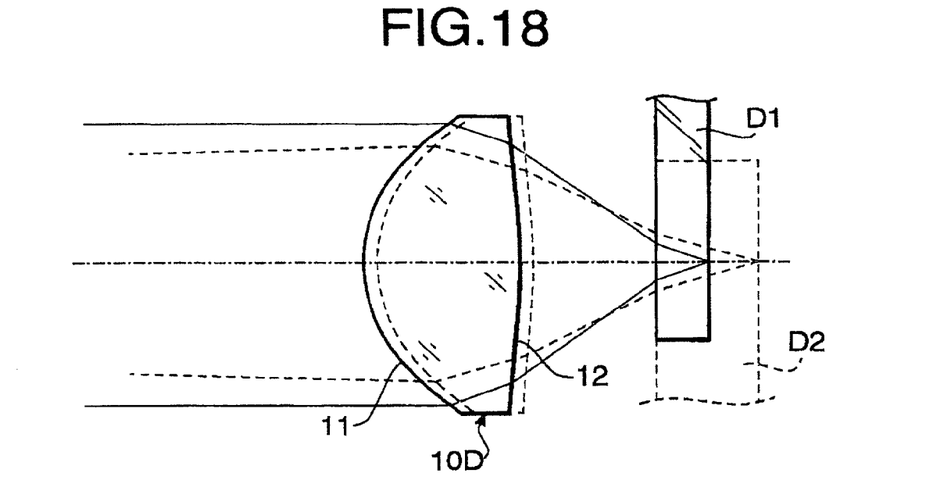
FIG. 18 schematically shows an arrangement of an objective lens and an optical disc according to a fifth embodiment.

FIG. 18 shows an objective lens 10D according to a fifth embodiment and the first and second optical discs D1 and D2. According to the fifth embodiment, the first laser beam incident on the objective lens is a slightly converging beam. The second laser beam incident on the optical disc D2 is, similarly to the other embodiment, a slightly diverging beam.

In the fifth embodiment, the first surface 11 of the objective lens 10D is divided into the common area RC ($0 \leq h < 1.18$) and the high NA exclusive area RE ($1.18 \leq h$), and in the high NA exclusive area RE, a diffraction lens structure which varies the spherical aberration depending on the wavelength of the light passing therethrough is formed. The common area RC of the first surface 11 is a continuous surface, which does not have a diffraction lens structure. The second surface 12 of the objective lens 10D is a rotationally symmetrical aspherical surface which is not formed with a diffraction lens structure.

TABLE 5 indicates a numerical structure of the objective lens 10D according to the fifth embodiment.

TABLE 5

$NA_1 = 0.60$ $f_1 = 2.33$ $\lambda_1 = 650$ $WD_1 = 1.14$ $OD_1 = 260.0$
$NA_2 = 0.47$ $f_2 = 2.35$ $\lambda_2 = 780$ $WD_2 = 0.94$ $OD_2 = -40.3$

| | First surface | | |
|---|---|---|---|
| | Common area ($0 \leq h < 1.18$) | High-NA exclusive area ($1.18 \leq h$) | Second surface |
| r | 1.453 | 1.437 | −6.28 |
| κ | −0.500 | −0.500 | 0.00 |
| $A_4$ | $-2.74 \times 10^{-4}$ | $-6.58 \times 10^{-4}$ | $3.43 \times 10^{-2}$ |
| $A_6$ | $1.03 \times 10^{-3}$ | $-1.95 \times 10^{-3}$ | $-6.43 \times 10^{-3}$ |
| $A_8$ | $-1.19 \times 10^{-3}$ | $-5.34 \times 10^{-4}$ | $-6.84 \times 10^{-3}$ |
| $A_{10}$ | $7.79 \times 10^{-4}$ | $2.19 \times 10^{-4}$ | $3.75 \times 10^{-3}$ |
| $A_{12}$ | $-4.18 \times 10^{-4}$ | $-3.10 \times 10^{-4}$ | $-6.28 \times 10^{-4}$ |
| $P_2$ | — | 3.19 | — |
| $P_4$ | — | $-1.60 \times 10^{-1}$ | — |
| $P_6$ | — | −1.87 | — |
| $P_8$ | — | 0.00 | — |
| $P_{10}$ | — | 0.00 | — |
| $P_{12}$ | — | 0.00 | — |
| d (distance between first and second surfaces | | 1.40 | |
| nd (refractive index of objective lens) | | 1.5436 | |
| vd (Abbe number of objective lens) | | 55.7 | |
| nd (refractive index of optical disc) | | 1.5855 | |
| vd (Abbe number of optical disc) | | 29.9 | |

Figure 19A:
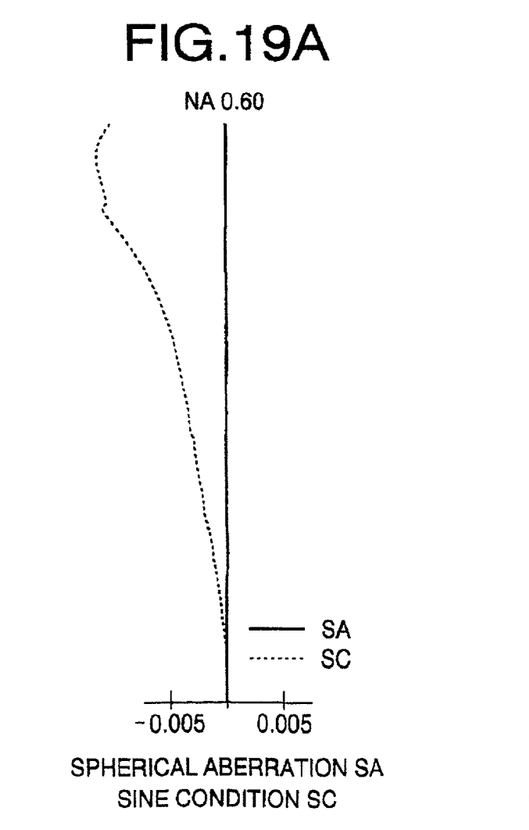
FIGS. 19A and 19B are graphs respectively showing spherical aberration and chromatic aberration according to the fifth embodiment, when a first optical disc is used.
Figure 19B:
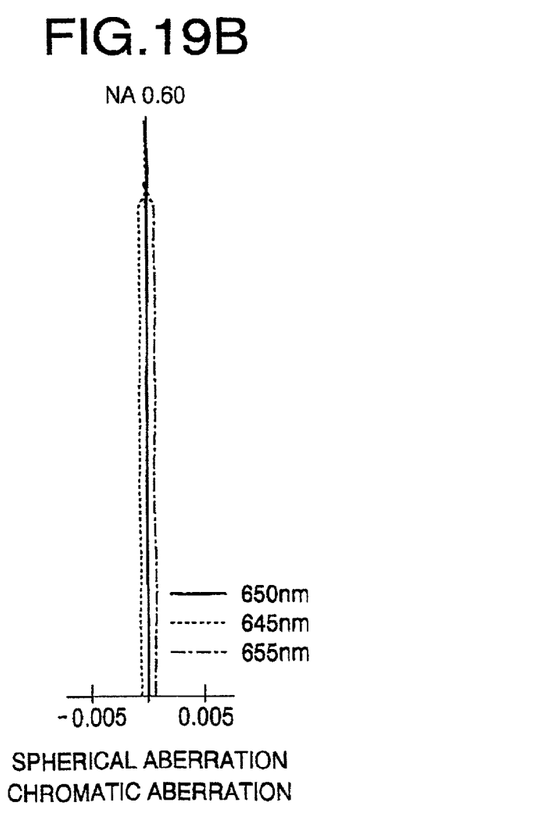

FIG. 19A shows a spherical aberration SA and a sine condition SC of the objective lens according to the fifth embodiment, with respect to the first optical disc D1, at the wavelength of 650 nm. FIG. 19B shows chromatic aberrations represented by spherical aberrations at wavelengths of 650 nm, 645 nm and 655 nm.

When the first optical disc D1 is used, the first laser beam (wavelength: 650 nm) is made incident on the objective lens 10D as slightly converging light (object distance: 260.00 mm). In this case, the high NA exclusive area RE functions to compensate for the aberration. Therefore, part of the laser beam passed through the common area RC and the part of the laser beam passed through the high NA exclusive area RE converge at a single point to form a beam spot, which is sufficiently small for data recording/readout on the first disc D1.

Figure 20A:
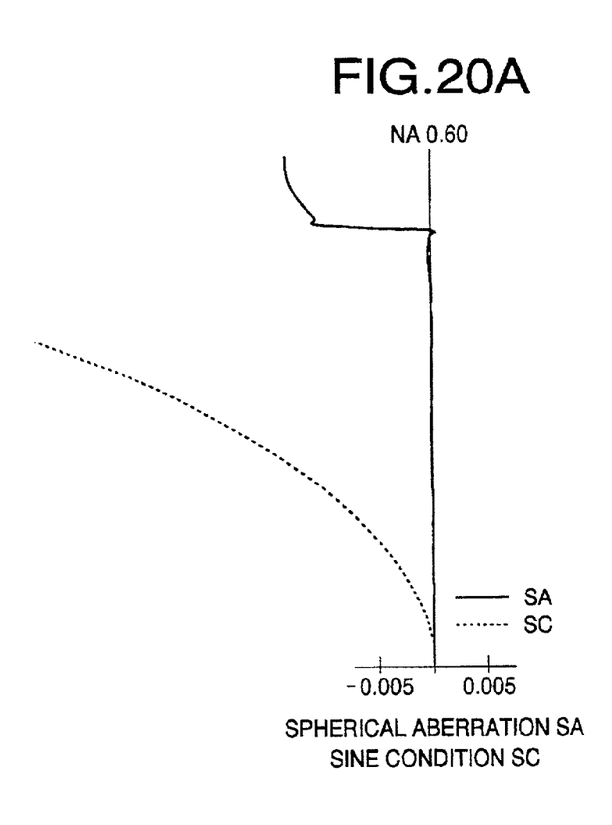
FIGS. 20A and 20B are graphs respectively showing spherical aberration and chromatic aberration according to the fifth embodiment, when a second optical disc is used.
Figure 20B:
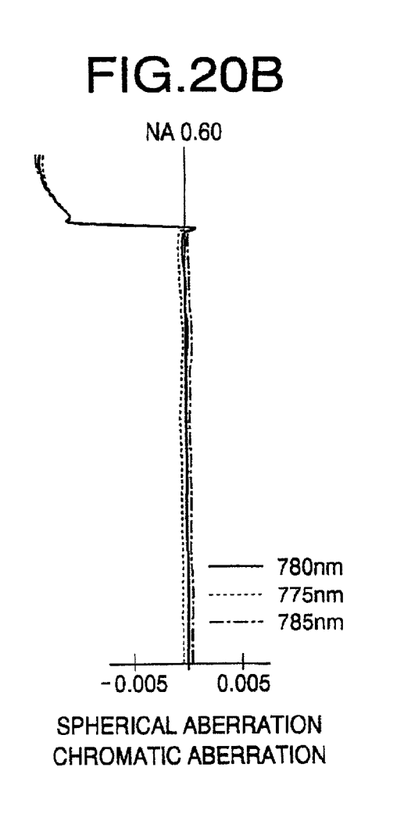

FIG. 20A shows a spherical aberration SA and a sine condition SC of the objective lens according to the fifth embodiment, with respect to the second optical disc D2, at the wavelength of 780 nm. FIG. 20B shows chromatic aberrations represented by spherical aberrations at wavelengths of 780 nm, 775 nm and 785 nm.

Figure 21A:
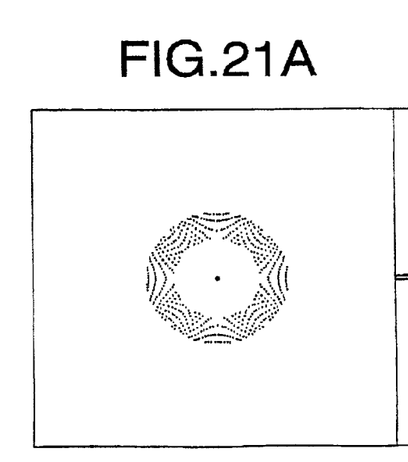
FIGS. 21A and 21B respectively show a spot diagram and a graph showing an intensity distribution according to the fifth embodiment, when a second optical disc is used.
Figure 21B:
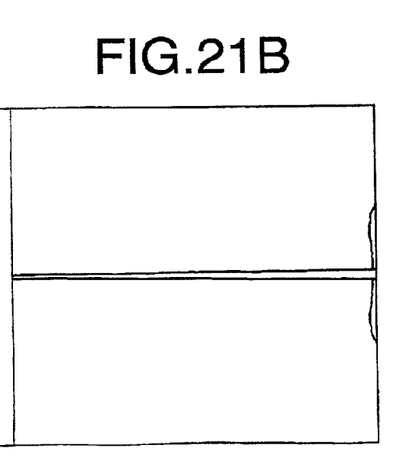

When the second optical disc D2 is used, the second laser beam (wavelength: 780 nm) is incident on the objective lens as diverging light fluxes (object distance: −40.3 mm). In this case, the high NA exclusive area RE generates the spherical aberration as shown in FIG. 20A. Therefore, as shown in a spot diagram (FIG. 21A) and the intensity distribution (FIG. 21B), only the portion of the laser beam passed through the common area RC forms a beam spot suitable for data recording/readout on the second optical disc D2. The portion of the laser beam passed through the high NA exclusive area RE is diffused within an annular area spaced from the beam spot.

As described above, according to the invention, the extent of convergence/divergence of a laser beam incident on an objective lens is varied depending on the thickness of the protective layer of the optical disc. With this configuration, it becomes possible to obtain a sufficient working distance of the objective lens even for an optical disc having a relatively thick protective layer. Accordingly, the focal length of the objective lens can be made shorter, which contributes to downsizing of the optical head.

Further, one surface of the objective lens is divided into the common area RC and the high NA exclusive area RE, and a diffraction lens structure for varying the spherical aberration depending on the wavelength is formed in the high NA exclusive area RE. With this configuration, for a high data density disc, portions of a beam passed through both the common area RC and the high NA exclusive area are converged at one point to achieve the high NA. For a low data density disc, a portion of a beam passed through the common area RC is converged on the disc, and a portion passed through the high NA exclusive area RE is diverged so as not to contribute to formation of the beam spot, thereby, a suitable NA is achieved.

The present disclosure relates to the subject matter contained in Japanese Patent Application No. 2000-294918, filed on Sep. 27, 2000, which is expressly incorporated herein by reference in its entirety.

What is claimed is:

1. An optical system for an optical head of an optical disc drive, the optical disc drive being capable of using at least a first disc and a second disc, a protective layer of the second disc being thicker than that of the first disc, a data density of the second disc being lower than that of the first disc, said optical system comprising:

a light source that selectively emits a first laser beam having a first wavelength and a second laser beam having a second wavelength, the second wavelength being longer than the first wavelength; and an objective lens that converges the first beam and the second beam on the first disc and the second disc, respectively, the second beam being incident on said objective lens as a diverging light beam, the first beam being incident on said objective lens as a beam of which a degree of divergence is less than that of the second beam, wherein one surface of said objective lens is divided into a common area at a central portion and a high NA exclusive area at a peripheral portion surrounding said common area, a diffraction lens structure including a plurality of concentric annular zones having minute steps being formed in said high NA exclusive area, said diffraction lens structure varies a spherical aberration depending on the wavelength of light passed therethrough, said diffraction lens structure compensating for aberrations of a portion of the first beam passed therethrough, said diffraction lens structure causes aberrations to a portion of the second laser beam passed therethrough, the first laser beam passed through said common area and said high NA exclusive area being converged on the first disc to form a beam spot, a portion of the second laser beam passed through said common area being converged on the second disc to form a beam spot, the portion of the second laser beam passed through said high NA exclusive area being diffused on the second disc.

2. The optical system according to claim 1, wherein said common area is configured to be a continuous surface without stepped portions.

3. The optical system according to claim 1, wherein said common area is formed with a diffraction lens structure including a plurality of concentric annular zones having minute steps.

4. The optical system according to claim 3, wherein said diffraction lens structure formed in said common area compensates for a chromatic aberration.

5. The optical system according to claim 1, wherein the first laser beam incident on said objective lens is a parallel light beam.

6. The optical system according to claim 1, wherein the first laser beam incident on said objective lens is a converging light beam.

7. An objective lens for an optical head of an optical disc drive, the optical disc drive being capable of using at least a first disc and a second disc, a protective layer of the second disc being thicker than that of the first disc, a data density of the second disc being lower than that of the first disc, a first laser beam having a first wavelength and a second laser beam having a second wavelength being selectively incident on said objective lens, the second wavelength being longer than the first wavelength, said objective lens converges the first beam and the second beam on the first disc and the second disc, respectively, said object lens comprising:

one surface that is divided into a common area at a central portion and a high NA exclusive area at a peripheral portion surrounding said common area, a diffraction lens structure including a plurality of concentric annular zones having minute steps being formed in said high NA exclusive area, said diffraction lens structure varies a spherical aberration depending on the wavelength of light passed therethrough, said diffraction lens structure compensating for aberrations of a portion of the first beam passed therethrough, said diffraction lens structure causes aberrations to a portion of the second laser beam passed therethrough, the first laser beam passed through said common area and said high NA exclusive area being converged on the first disc to form a beam spot, a portion of the second laser beam passed through said common area being converged on the second disc to form a beam spot, the portion of the second laser beam passed through said high NA exclusive area being diffused on the second disc due to the aberration caused by the diffraction lens structure.

8. The objective lens according to claim 7, wherein said common area is configured to be a continuous surface without stepped portions.

9. The objective lens according to claim 7, wherein said common area is formed with a diffraction lens structure including a plurality of concentric annular zones having minute steps.

10. The objective lens according to claim 9, wherein said diffraction lens structure formed in said common area compensates for a chromatic aberration.

11. The objective lens according to claim 7, wherein the first laser beam incident on said objective lens is a parallel light beam.

12. The objective lens according to claim 7, wherein the first laser beam incident on said objective lens is a converging light beam.

* * * * *